United States Patent
Horesh

(10) Patent No.: US 10,182,181 B2
(45) Date of Patent: Jan. 15, 2019

(54) SYNCHRONIZATION OF ROLLING SHUTTER CAMERA AND DYNAMIC FLASH LIGHT

(71) Applicant: Intel Corporation, Santa Clara, CA (US)

(72) Inventor: Nizan Horesh, Caesarea (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/582,047

(22) Filed: Dec. 23, 2014

(65) Prior Publication Data

US 2016/0182790 A1 Jun. 23, 2016

(51) Int. Cl.
 *H04N 5/235* (2006.01)
 *H04N 5/225* (2006.01)
 *H04N 5/353* (2011.01)

(52) U.S. Cl.
 CPC .......... *H04N 5/2256* (2013.01); *H04N 5/2353* (2013.01); *H04N 5/2354* (2013.01); *H04N 5/3532* (2013.01)

(58) Field of Classification Search
 CPC .. H04N 5/2352; H04N 5/2353; H04N 5/2354; H04N 5/2256
 See application file for complete search history.

(56) References Cited

U.S. PATENT DOCUMENTS

| 2003/0007088 A1* | 1/2003 | Rantanen | H04N 5/2354 348/371 |
| 2005/0174473 A1* | 8/2005 | Morgan | F21S 48/325 348/370 |
| 2008/0166112 A1* | 7/2008 | Takematsu | H04N 5/2256 396/28 |
| 2008/0231742 A1* | 9/2008 | Kurase | G03B 15/02 348/333.01 |
| 2012/0207460 A1* | 8/2012 | Clark | G03B 9/40 396/180 |

(Continued)

FOREIGN PATENT DOCUMENTS

| JP | 2007318581 | 12/2007 |
| JP | 2014006304 | 1/2014 |

OTHER PUBLICATIONS

International Search Report and Written Opinion received for PCT Patent Application No. PCT/US2015/062140, dated Mar. 4, 2016, 12 pages.

(Continued)

*Primary Examiner* — Abdelaaziz Tissire

(57) ABSTRACT

Various embodiments may be generally directed to techniques for synchronizing operation of a flash light with operation of a camera using a rolling shutter for image capture. Various embodiments provide techniques for illuminating portions of a field of view of a camera substantially synchronously with portions of the field of view of the camera undergoing image capture. Various embodiments provide techniques for illuminating sequential sections of the camera field of view, rather than the entire field of view of the camera, at substantially the same time that a sensor of the camera performs image capture operations using corresponding portions of an image sensor, such as exposing the sensors to light from the image to be captured.

20 Claims, 14 Drawing Sheets

(56) References Cited

U.S. PATENT DOCUMENTS

| | | | | |
|---|---|---|---|---|
| 2013/0335577 A1* | 12/2013 | Chiu | ............... | H04N 5/23296 |
| | | | | 348/169 |
| 2014/0055771 A1* | 2/2014 | Oggier | ............... | G01S 17/89 |
| | | | | 356/5.01 |
| 2014/0078383 A1* | 3/2014 | Schmaelzle | ............ | G03B 15/02 |
| | | | | 348/371 |
| 2014/0198219 A1* | 7/2014 | Chuang | ............... | H04N 5/2354 |
| | | | | 348/164 |
| 2014/0368684 A1* | 12/2014 | Venkataraman | ............ | |
| | | | | H01L 27/14618 |
| | | | | 348/218.1 |
| 2015/0186722 A1* | 7/2015 | Cho | ............... | G06K 9/00604 |
| | | | | 348/78 |
| 2015/0241713 A1* | 8/2015 | Laroia | ............... | G02B 27/648 |
| | | | | 348/208.2 |
| 2017/0078580 A1* | 3/2017 | Masuda | ............... | G03B 7/16 |

OTHER PUBLICATIONS

Search Report received for Taiwanese Patent Application No. 104138529, dated Oct. 16, 2017, 1 page (untranslated).

* cited by examiner

*100*

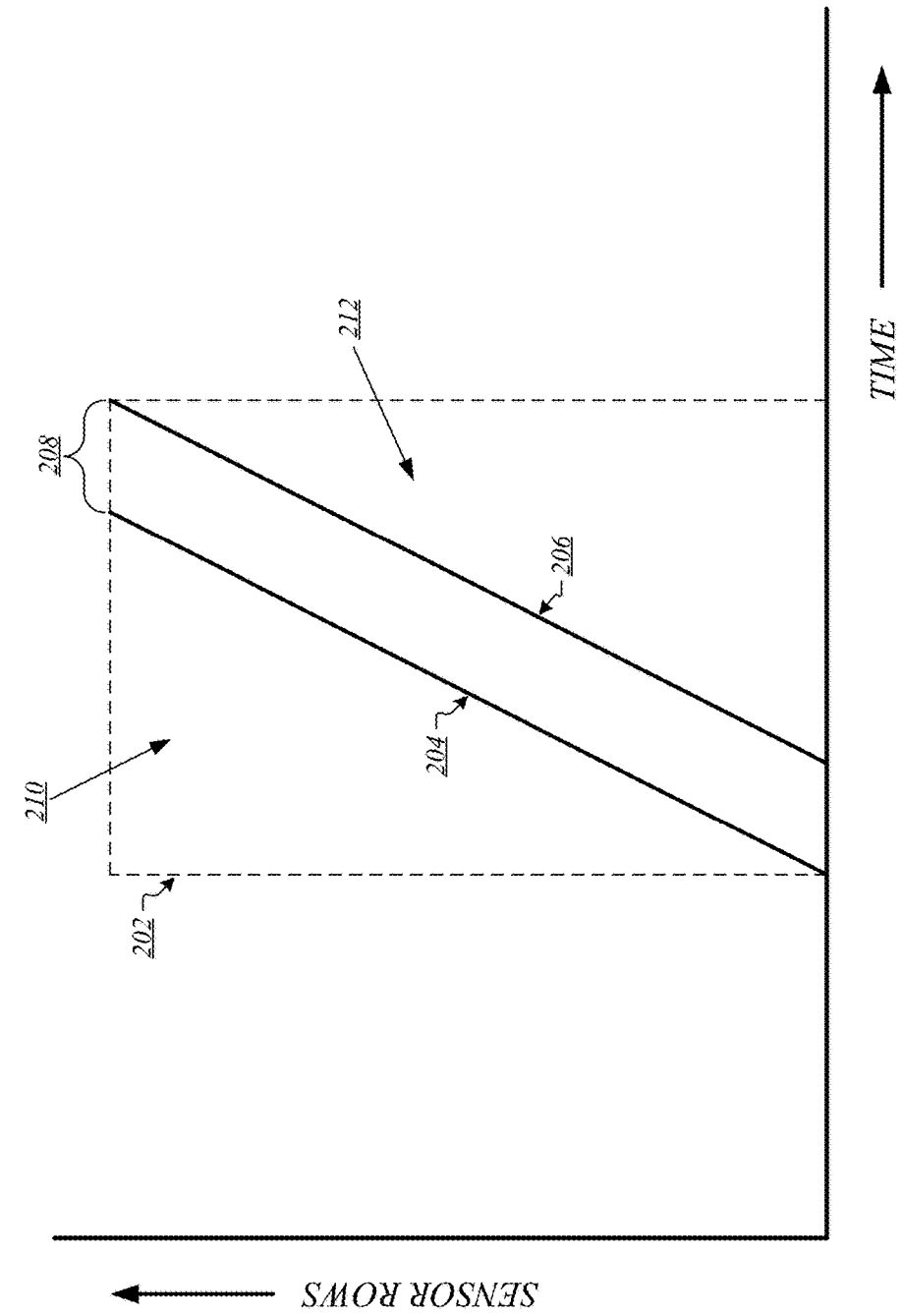

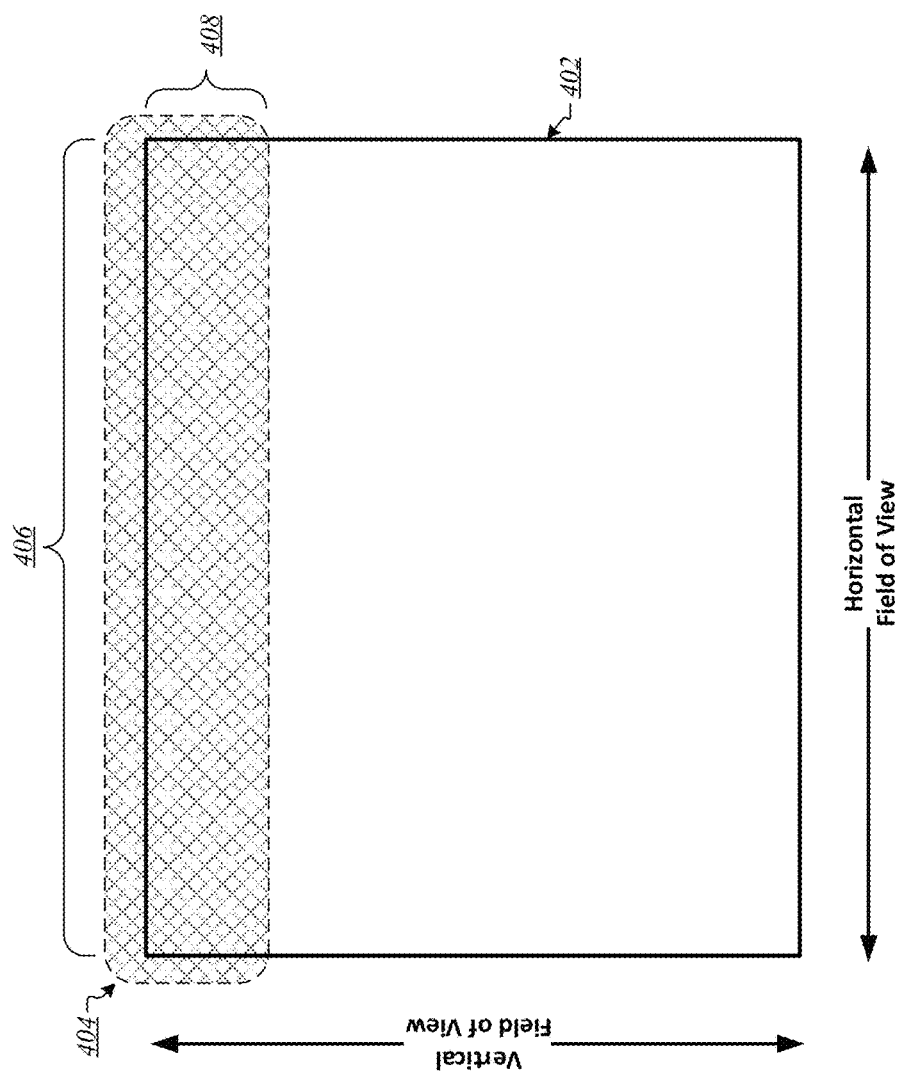

SYNCHRONIZATION OF ROLLING SHUTTER CAMERA AND DYNAMIC FLASH LIGHT

TECHNICAL FIELD

Embodiments herein generally relate to synchronization of a flash light with image capture operations of a camera.

BACKGROUND

Conventional cameras with rolling shutters typically employ a flash light that illuminates the entire field of view of the camera for the entire duration of an image camera process. Consequently, portions of the field of view can be needlessly illuminated. As a result, the flash light can quickly drain a power source of these convention cameras. Further, these conventional cameras often reduce the illumination provided by the flash light to conserve power resources, thereby reducing image quality of the captured image.

BRIEF DESCRIPTION OF THE DRAWINGS

FIG. 2 illustrates flash light operation for a conventional camera.

FIG. 4 illustrates a first operation of the first apparatus and/or the first system.

DETAILED DESCRIPTION

Various embodiments may be generally directed to techniques for synchronizing operation of a flash light with operation of a camera using a rolling shutter for image capture. Various embodiments provide techniques for illuminating portions of a field of view of a camera substantially synchronously with portions of the field of view of the camera undergoing image capture. Various embodiments provide techniques for illuminating sequential sections of the camera field of view, rather than the entire field of view of the camera, at substantially the same time that a sensor of the camera performs image capture operations, such as exposing sensors to light from the image to be captured.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1A:
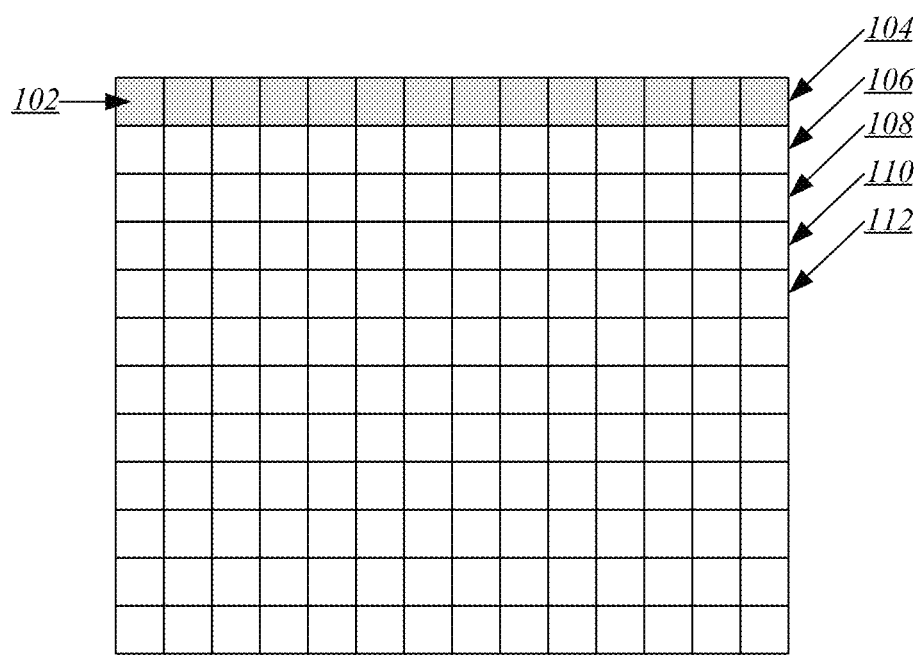
FIGS. 1A-1E illustrate an embodiment of an image capture technique.

FIGS. 1A-1E illustrate operation of an exemplary image sensor array 100 as a rolling shutter. The image sensor array 100 can capture image data when operated as a rolling shutter. As shown in FIG. 1A, the image sensor array 100 can be formed from an arrangement of individual image sensors 102. The image sensors 102 can be arranged into rows or lines (and/or columns). FIG. 1A illustrates exemplary sensor rows 104, 106, 108, 110, and 122. The image sensor array 100 includes the same number of image sensors 102 in each row but is not so limited. Image data can be captured from portions of the image sensor array 100 sequentially. For example, image data can be captured from each sensor row of the image sensor array 100 sequentially, as opposed to capturing image data from each sensor row of the image sensor array 100 at the same time.

In FIG. 1A, each image sensor 102 of the sensor row 104 is shown as being reset. Resetting an image sensor 102 can clear any charge accumulated in the image sensor 102 and/or can prepare the image sensor 102 for exposure to light in preparation of image capture.

Figure 1B:
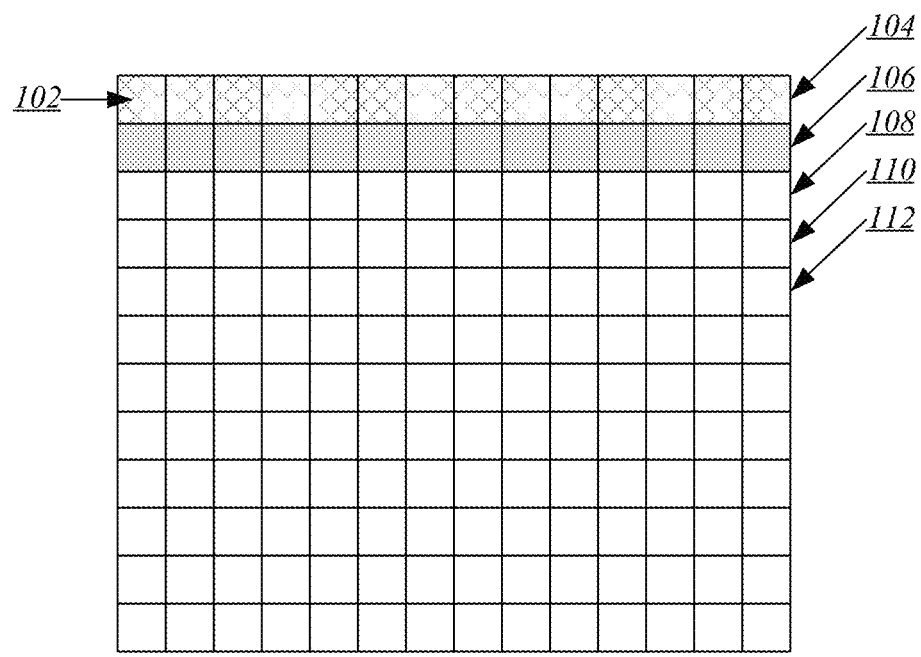

FIG. 1B can represent an operational state of the image sensor array 100 at time later than the operational state of the image sensor 100 as depicted in FIG. 1A. In FIG. 1B, each image sensor 102 of sensor row 106 can be reset and each image sensor 102 of sensor row 104 can be exposed to light to initiate image capture.

Figure 1C:
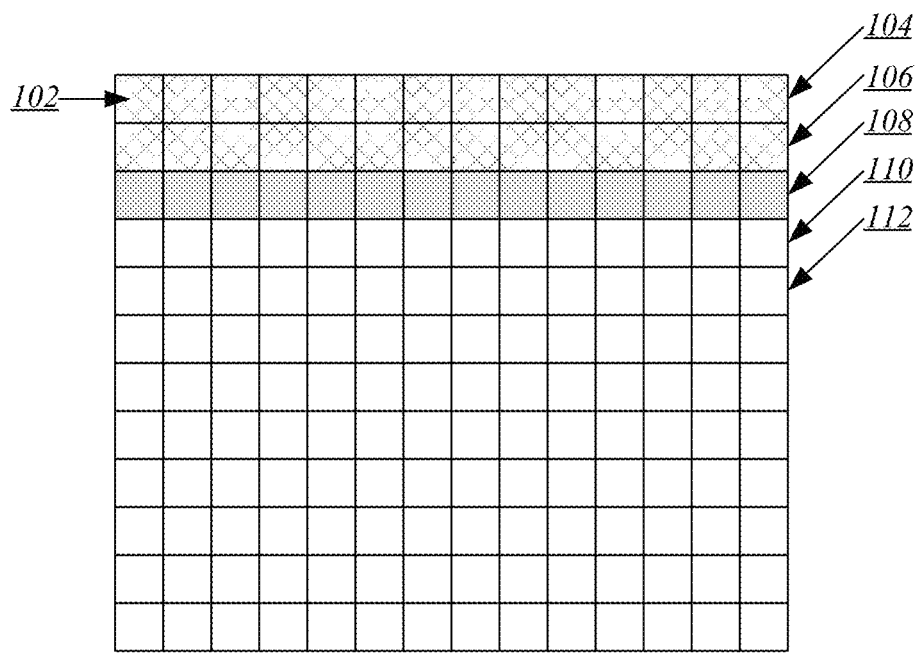

FIG. 1C can represent an operational state of the image sensor array 100 at time later than the operational state of the image sensor 100 as depicted in FIG. 1B. In FIG. 1C, each image sensor 102 of sensor row 108 can be reset and each image sensor 102 of sensor rows 104 and 106 can be exposed to light.

Figure 1D:
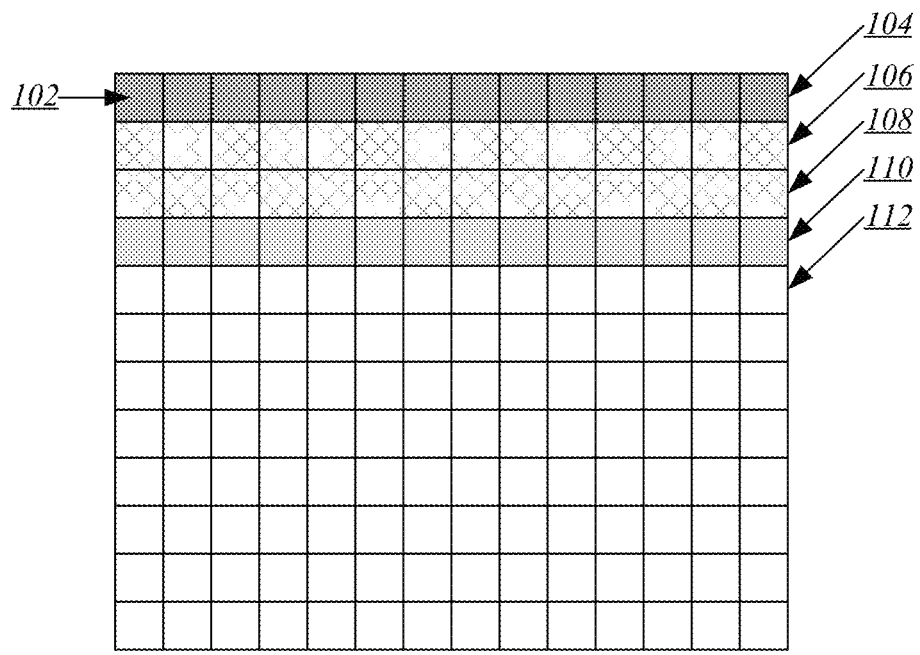

FIG. 1D can represent an operational state of the image sensor array 100 at time later than the operational state of the image sensor 100 as depicted in FIG. 1C. In FIG. 1D, each image sensor 102 of sensor row 110 can be reset and each image sensor 102 of sensor rows 106 and 108 can be exposed to light. Further, each image sensor 102 of sensor row 104 can be readout, essentially capturing image data from each image sensor 102 of sensor row 104.

Figure 1E:
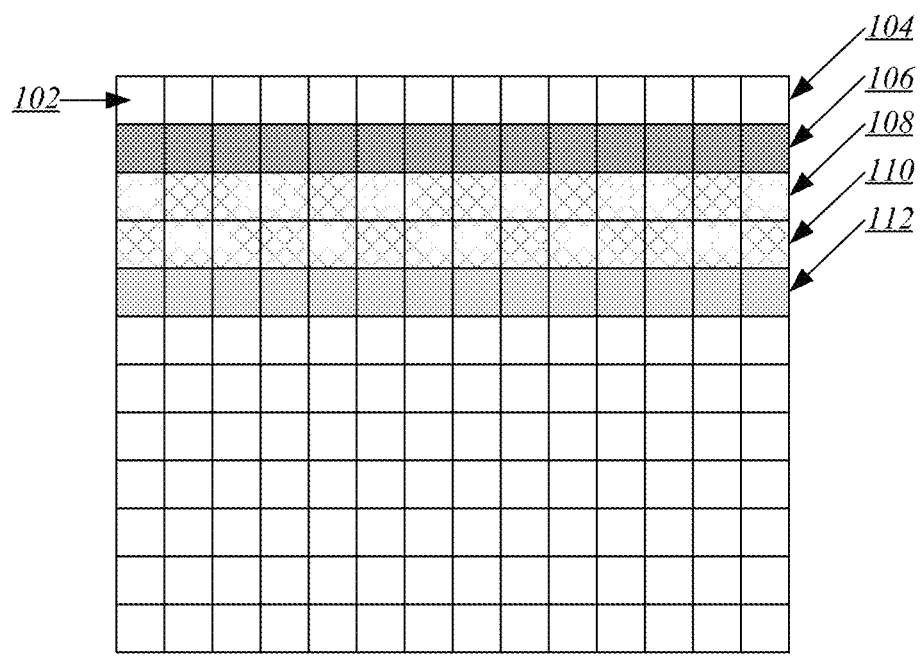

FIG. 1E can represent an operational state of the image sensor array 100 at time later than the operational state of the image sensor 100 as depicted in FIG. 1D. In FIG. 1E, each image sensor 102 of sensor row 112 can be reset and each image sensor 102 of sensor rows 108 and 110 can be exposed to light. Further, each image sensor 102 of sensor row 106 can be readout, essentially capturing image data from each image sensor 102 of sensor row 106. Sensor row 104 can be inactive, since its image data has been captured. Other sensor rows of the image sensor array that are not undergoing a reset, exposure, or readout operation can also be considered to be inactive.

FIGS. 1A-1E illustrate the sequential operations of resetting, exposing, and reading out each sensor row of the image sensor array 100. At the end of this sequential process, image data from a camera's field of view can be captured, with each sensor row capturing image data for a corresponding portion of the camera's field of view. As shown in FIGS. 1A-1E, the reset, exposure, and readout operations are shown as occurring on a row-by-row basis in a top-down fashion but are not so limited. For example, the reset, exposure, and readout operations can occur on a row-by-row basis in a bottom to top fashion or can occur on a columnby-column basis, sweeping left to right or right to left across the image sensor array 100. Further, one or more of the sequential reset, exposure, and readout operations can be applied to multiple rows or columns of the image sensor array 100 at the same time. For example, one or more rows of the image sensor array 100 can undergo an image capture operation at substantially the same time. In some embodiments, one or more of the sequential reset, exposure, and readout operations can be applied to portions of the image sensor array 100 in different operational directions. For example, a top half of the image sensor array 100 can undergo reset, exposure, and readout operations in a bottom to top fashion while a bottom half of the image sensor array 100 can undergo reset, exposure, and readout operations in a top to down fashion.

Conventional cameras with rolling shutters typically provide a flash light that illuminates a camera's entire field of view for substantially the entire image capture operation of the rolling shutter. As such, portions of the camera's field of view that correspond to portions the image sensor array that are inactive (e.g., that are not actively being exposed to light or have already been readout to capture image data) can be illuminated. Since these portions of the image sensor array are not actively capturing image data, the illumination of these corresponding portions of the camera's field of view is inefficient. For example, for a conventional camera with rolling shutter, the flash light illumination can last for approximately 0.1 seconds, roughly equivalent to a total readout time for the image sensors. However, for the same conventional camera, flash light illumination is required only during exposure of the sensors which can be approximately less than 0.01 seconds. As a result, with a conventional camera, the flash light duration over the entire field of view is much longer than necessary. This can cause a conventional camera to quickly drain a power source. Further, a conventional camera can reduce the amount of light provided by its flash light in order to save power resources, which can reduce the quality of a captured image. An alternative to using a rolling shutter can be a global shutter. However, global shutter cameras are much more expensive and typically have low resolution, making them a poor match for use as integrated cameras in handheld computing devices such as smartphones and tablets.

FIG. 2 provides a representation 200 of operation of a flash light for a conventional camera with a rolling shutter. As shown in FIG. 2, sensor row reset 204 occurs for each sensor row sequentially. Similarly, at a later time, sensor row readout 206 occurs for each sensor row sequentially. The image capture process can begin with a first row undergoing reset 204 and can end with a last row undergoing readout 206, at which time all image data can be captured. Flash light illumination 202 can be provided for all sensor lines for the entire image capture process. However, effective flash light illumination 208 is provided only between sensor row reset 204 and sensor row readout 206. Flash light illumination of a sensor row prior to reset 204 and after readout 206 is unnecessary and inefficient. As shown in FIG. 2, extraneous flash light illumination is indicated by region 210, bounded by flash light illumination 202 and reset operation 204, and by region 212, bounded by readout operation 206 and flash light illumination 202.

Disclosed herein are techniques for synchronizing operation of a flash light with operation of a camera using a rolling shutter for image capture. Disclosed herein are techniques for illuminating portions of a field of view of a camera substantially synchronously with portions of the field of view of the camera undergoing image capture. Disclosed herein are techniques for illuminating sequential sections of the camera field of view, rather than the entire field of view of the camera, at substantially the same time that a sensor of the camera performs image capture operations using corresponding portions of an image sensor, such as exposing the sensors to light from the image to be captured.

Figure 3A:
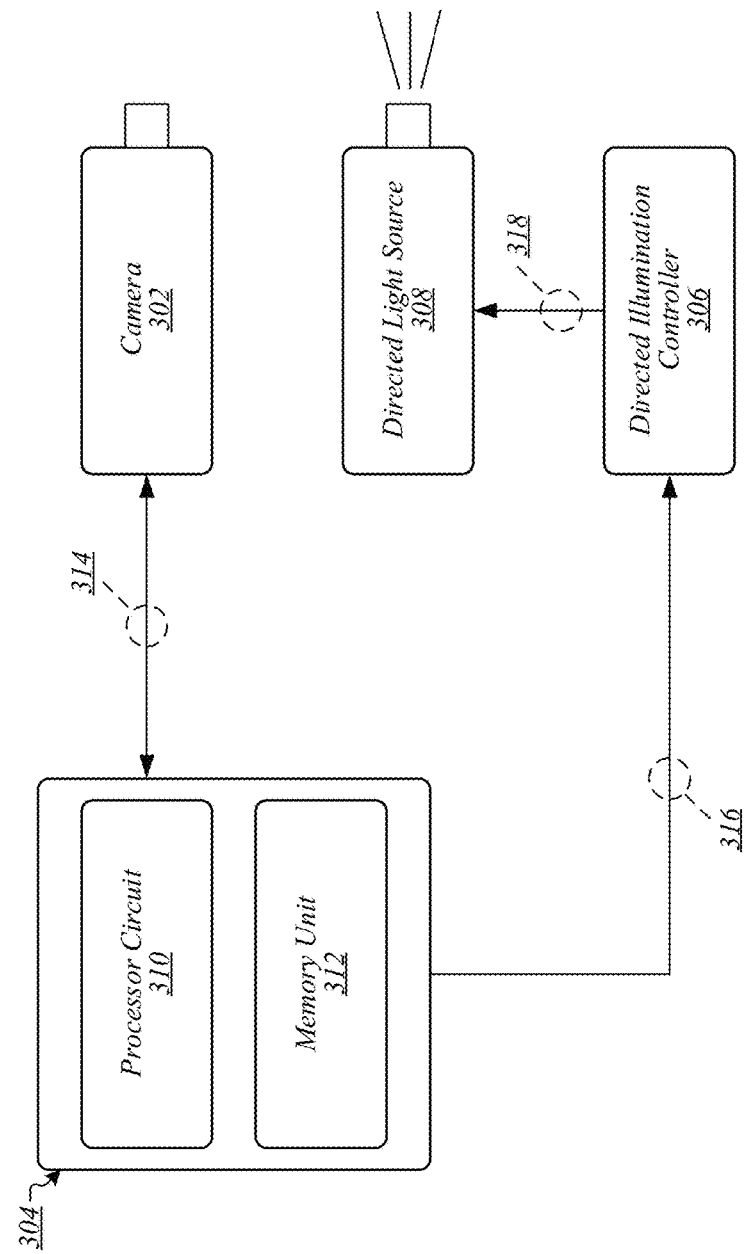
FIG. 3A illustrates an embodiment of a first apparatus.

FIG. 3A illustrates an apparatus 300 that can provide synchronization of a rolling shutter camera and a dynamic flash light. As shown in FIG. 3A, the apparatus 300 can include a camera 202, a processing unit 304, a directed illumination controller 306, and a directed light source 308. The camera 302 can be operated as a rolling shutter camera. The camera 302 can include image sensors that can be controlled in a sequential manner to effectuate image capture. As further shown in FIG. 3A, the processing unit 304 can include a processor circuit 310 and a memory unit 312.

Processor circuit 310 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 310 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 310 may be implemented as a general purpose processor, such as a processor made by Intel® Corporation, Santa Clara, Calif. The embodiments are not limited in this context.

In various embodiments, any constituent component of apparatus 300 and/or processor circuit 310 may comprise or be arranged to communicatively couple with memory unit 312. Memory unit 312 may be implemented using any machine-readable or computer-readable media capable of storing data, including both volatile and non-volatile memory. For example, memory unit 312 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 312 may be included on the same integrated circuit as processor circuit 310, or alternatively some portion or all of memory unit 312 may be disposed on an integrated circuit or other medium, for example a hard disk drive, that is external to the integrated circuit of processor circuit 310. Although memory unit 312 is comprised within or as part of apparatus 300 and/or processing unit 304 in FIG. 3A, memory unit 312 may be external to apparatus 300 and/or processing unit 304 in some embodiments. The embodiments are not limited in this context.

Certain functions or features of the camera 302 can be operated or controlled by the processing unit 304. For example, the processor unit 304 can initiate or trigger an image capture operation using the camera 302 (e.g., by way of user direction or input forwarded to the camera 302 by the processing unit 304 or some other component not illustrated in FIG. 3A). Alternatively, the camera 302 can directly receive a user input to initiate an image capture operation. The camera 302 can control certain functions or features such as lens movement or the field of view of the camera 302.

The directed light source 308 can provide a flash light source for the camera 302. The directed light source 308 can provide a steerable beam of light with a field of view of the camera 302. The directed light source 308 can be implemented using a micro-electromechanical systems (MEMS) based minor. As an example, the directed light source can be implemented using a MEMS based minor. The directed light source 308 can also be implemented using a liquid crystal (LC) grating. Further, the directed light source 308 can be implemented using an optical phased array.

The directed light source 308 can illuminate regions or portions of the field of view of the camera 302. That is, the directed light source 308 can be controlled to provide a beam of light that illuminates sequential sections of the field of view of the camera 302. In this way, the directed light source 308 can illuminate less than the entire field of view of the camera 302 can be considered to provide a dynamic light source. Moreover, the directed light source 308 can illuminate sections of the field of view of the camera 302 in synchronization with the rolling shutter image capture operations of the camera 302. This allows the directed light source 308 to illuminate portions of the field view corresponding to portions of the image sensor that are undergoing reset, exposure, and/or readout operations. In some embodiments, the directed light source 308 can illuminate portions of an image that are being exposed (and not other portions of the image), thereby efficiently illuminating the image. As different regions of the image are exposed, the directed light source 308 can substantially synchronously project light onto these particular regions of the image.

The directed illumination controller 306 can control operation of the directed light source 308. As an example, the directed illumination controller 306 can provide the directed light source 308 with a light beam steering signal 318. The light beam steering signal 318 can specify a direction for the steerable beam of light provided by the directed light source 308 and/or can specify a region of a field of view to be illuminated.

By coordinating the roiling shutter operations of the camera 302 with the steerable beam of light provided by the directed light source 308, the apparatus 300 can provide more efficient and/or brighter illumination. For example, the directed light source 308 can provide enhanced illumination for distinct regions of the field of view of the camera 302 substantially synchronously with the rolling shutter operations of the camera 302. As a result, unnecessary illumination of portions of a field of view prior to and after rolling shutter operations by the camera 302 can be minimized or reduced.

Prior to implementing rolling shutter image capture operations, the camera 302 can provide the processing unit 304 with a camera synchronization signal 314. The camera 302 can generate and transmit the camera synchronization signal 314, and the processing unit 304 can receive and process the camera synchronization signal 314, just prior to the camera 302 initiating image capture operations using a rolling shutter technique. The camera synchronization signal 314 can trigger the processing unit 304 to implement synchronization operations of the directed light source 308.

Upon receipt of the camera synchronization signal 314, the processing unit 304 can generate an illumination information signal 316. The illumination information signal 316 can include an illumination pattern of the directed light source 308. The illumination pattern can specify the regions of the field of view of the camera 302 to be illuminated in synchronization with the rolling shutter image capture operations of the camera 302. The processing unit 304 can generate the illumination pattern based on the field of view of the camera 302 (e.g., based on information regarding the field of view for a particular image capture operation as provided by the camera 302 to the processing unit 304), based on a clock rate of the rolling shutter operation of the camera 302 (e.g., based on a speed at which image sensors of the camera 302 are sequentially reset, exposed, and/or readout), based on characteristics of the rolling shutter operation of the camera 302 (e.g., based on how many image sensor rows or columns are grouped together for any of a reset, exposure, or readout operation), and based on delays associated with the apparatus 300 (e.g., based on delays associated with the directed illumination controller 306 in adjusting operation of the directed light source 308, including delays in generating any operational signals and/or delays in controlling any operational component).

The sequential regions or sections of the field of view of the camera 302 that are to be illuminated in accordance with the illumination pattern can comprise overlapping or non-overlapping portions of the field of view. Further, the sequential regions or sections of the field of view of the camera 302 can be horizontally or vertically parsed portions. The illumination pattern can specify the amount of time each sequential section or region of the field of view of the camera 302 is to be illuminated and can account for the scan direction of the rolling shutter operations of the camera 302. The amount of time specified for illumination can be the same or can be different for each sequentially illuminated region. The illumination pattern can further specify the direction for which the directed light source 308 is to be pointed and/or the direction the provided light beam is to be pointed/directed. As an example, the position of the directed light source 308 can be specified according to:

$$\theta(T) = \left(\frac{\text{Rolling Shutter Rate} * (T + \text{Illumination Delay})}{\text{Total Sensor Lines}}\right) * (\text{Vertical Field of View})$$

where θ can represent the direction of the provided flash light (e.g., either by steering a light beam or moving a light source), T can represent time (e.g., seconds), the rolling shutter rate can be a rate at which the rolling shutter operates in terms of sensor lines per second, the illumination delay can account for operational delays associated with synchronization operations between the camera and the flash light, the total sensor lines can be the total number of sensor lines of a sensor array of the camera, and the vertical field of view can indicate a portion of a field of view and can be specified relative to one or more lines of the sensor.

The illumination information signal 316 can be provided to the directed illumination controller 306. The directed illumination controller 306 can generate the light beam steering signal 318 based on the received illumination information signal 316. As previously mentioned, the light beam steering signal 318 can specify a movement of the directed light source 308. For example, the light beam steering signal 318 can specify a vertical and/or horizontal movement of the directed light source 308 and/or can specify an angular movement or tilt to be made by the directed light source 308 (and/or direction of the provided light beam). Based on the illumination pattern provided in the illumination information signal 316, the light beam steering signal 318 can be updated or newly provided to the directed light source 308 so as to synchronize illumination of a portion of the field of view of the camera 302 that is currently being processed for image capture by the camera (e.g., corresponding to exposed image sensors). Multiple light beam signals 318 can be generated based on the illumination pattern such that taken together, the light beam steering signals 318 provide illumination of the entire field of view of the camera 302.

The directed light source 308 can be controlled in a continuous or a discrete manner. That is, the movement of the directed light source 318 (e.g., mechanically) or the movement of the light beam provided by directed light source 318 (e.g., by light beam steering) can be a substantially continuous movement or can be controlled in discrete steps. Accordingly, the movement of the provided light beam on sequentially illuminated portions of the camera's field of view can be continuous or provided in a discrete fashion.

Capturing image data can include one or more of the operations of reading out image data from a sensor or storing the image data in a memory (e.g., the memory unit 312). The apparatus 300 can capture image data such as still image data for a photograph or can capture active image data such as video data.

The apparatus 300 can be implemented or provided with a system as part of a larger device. For example, the apparatus can be provided as part of a handheld computing device such as, for example, a smartphone. In various embodiments, the apparatus 300, as part of a larger system, can implemented with one or more of the components depicted in FIG. 3A. For example, the apparatus can be implemented using the camera 302, the directed light source 308, and/or the directed illumination controller 306 and the larger system can provide the functionality of the processing unit 304 and/or any component therein (e.g., a processing unit of a smartphone can provided the functionality of the processing unit 304). In this way, the apparatus 300 can provided a component functionality of a larger system that is integrated into the system. As part of a larger system (e.g., a smartphone), the apparatus 300 can be integrated in the system having a display, a radio frequency (RF) transceiver, and/or a user interface. Further, in some embodiments, the apparatus 300 can be implemented with the processing unit 304 providing the functionality of the directed illumination controller 306 such that the processing unit 304 can directly control the directed light source 308.

Figure 3B:
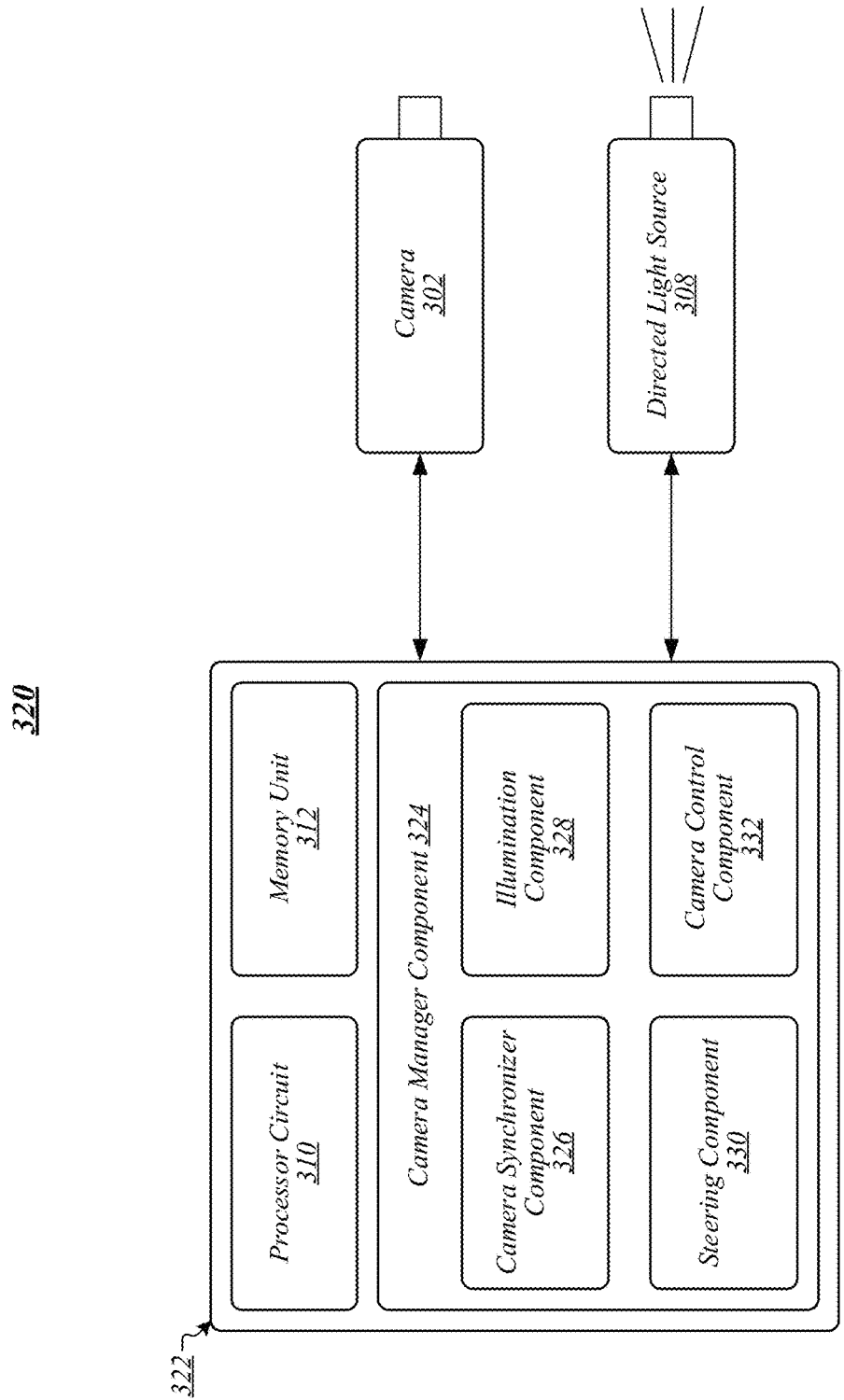
FIG. 3B illustrates an embodiment of a first system.

FIG. 3B illustrates a system 320 that can provide synchronization of a rolling shutter camera and a dynamic flash light. In various embodiments, the system 320 can provide the same functionality and capabilities as the apparatus 300 to provide sequential illumination and image capture for portions of a field of view of a camera.

As shown in FIG. 3B, the system 320 can include the camera 302, the directed light source 308, and a processing unit 322. The processing unit can include the processor circuit 310 and the memory unit 312. The processing unit 322 can further include a camera management component 324. The camera management component 324 can include a camera synchronizer component 326, an illumination component 328, a steering component 330, and a camera control component 332. The processing unit 322, or any constituent component thereof (e.g., the processor circuit 310), can be coupled to the camera 302 and the directed light source 308. The processing unit 322 can be in operative communication with the camera 302 and the directed light source 308 such that, for example, information or communication messages can be shared between the processing unit 322 and the camera 302 and the directed light source 308.

The camera manager component 324 may comprise logic, circuitry, and/or instructions (e.g., instructions capable of being executed by the processor circuit 310) to manage and control operation of the camera 302 and the directed light source 308 to effectuate image capture in accordance with the techniques described herein. In various embodiments, particular management and control functionality of the camera management component 324 can be provided by the constituent camera synchronizer component 326, illumination component 328, steering component 330, and camera control component 332.

The camera synchronizer component 326 may comprise logic, circuitry, and/or instructions (e.g., instructions capable of being executed by the processor circuit 310) to generate camera synchronization information. The camera synchronization information can be generated based on an indication of an initiation of an image capture operation, and can indicate the same. As an example, the camera synchronization information can be generated based on receipt of an input of a user or an input received from the camera 302 indicating initiation of an image capture operation. The camera synchronization information can include information regarding the operating state or characteristics of the camera 302 and/or characteristics of the initiated image capture operations. As an example, the camera synchronization information can include information regarding the field of view of the camera 302 and/or the operating speed of the camera 302.

The illumination component 328 may comprise logic, circuitry, and/or instructions (e.g., instructions capable of being executed by the processor circuit 310) to generate illumination information. The illumination information can be based on the camera synchronization information. The illumination information can cause sequential illumination of portions of a field of view of the camera 302. The illumination information can indicate sequential sections of the field of view of the camera to be illuminated. The illumination component 328 can generate the illumination information based on the information provided by the camera synchronization information generated by the camera synchronizer component 326, and/or based on other stored or predetermined information regarding the camera 302 (e.g., as stored in memory unit 312) and/or information regarding the initiated image capture operation. The illumination information can generate the information regarding the sequential portions of the field of view of the camera 302 to be illuminated to effectuate synchronized image capture by the camera 302 in accordance with the techniques described herein.

The steering component 330 may comprise logic, circuitry, and/or instructions (e.g., instructions capable of being executed by the processor circuit 310) to generate light beam steering information based on the illumination information. The light beam steering information can specify or can be used to control movement of a light beam of the directional light source 308. The light beam steering information can specify or indicate a position of the light beam within the field of view of the camera for each of the sequential sections of the field of view of the camera to be illuminated. The light beam steering information can be provided to the directional light source 308. The direction light source 308 can steer its light beam based on the light beam steering information to effectuate sequential illumination of the determined portions of the field of view of the camera 302.

The camera control component 332 may comprise logic, circuitry, and/or instructions (e.g., instructions capable of being executed by the processor circuit 310) to control the camera 302. The camera control component 332 can cause the camera 302 to capture image data within the sequentially illuminated portions of the field of view of the camera 302 (e.g., as illuminated by the directional light source 308). The camera control component 332 can exchange operative control messages with the camera 302 to effectuate control of the camera 302. Image data captured by the camera 302 can be provided to the processing unit 322. The processing unit 322 can receive, process, and/or store the captured image data (e.g., in memory unit 312). The camera control component 332 can cause the camera 302 to capture image data according to rolling shutter techniques described herein. Collectively, the processing unit 322 can control the camera 302 and the directed light source 308 to enable image data to be captured within sequentially illuminated portions of the field of view of the camera 302 using rolling shutter techniques described herein.

Figure 5:
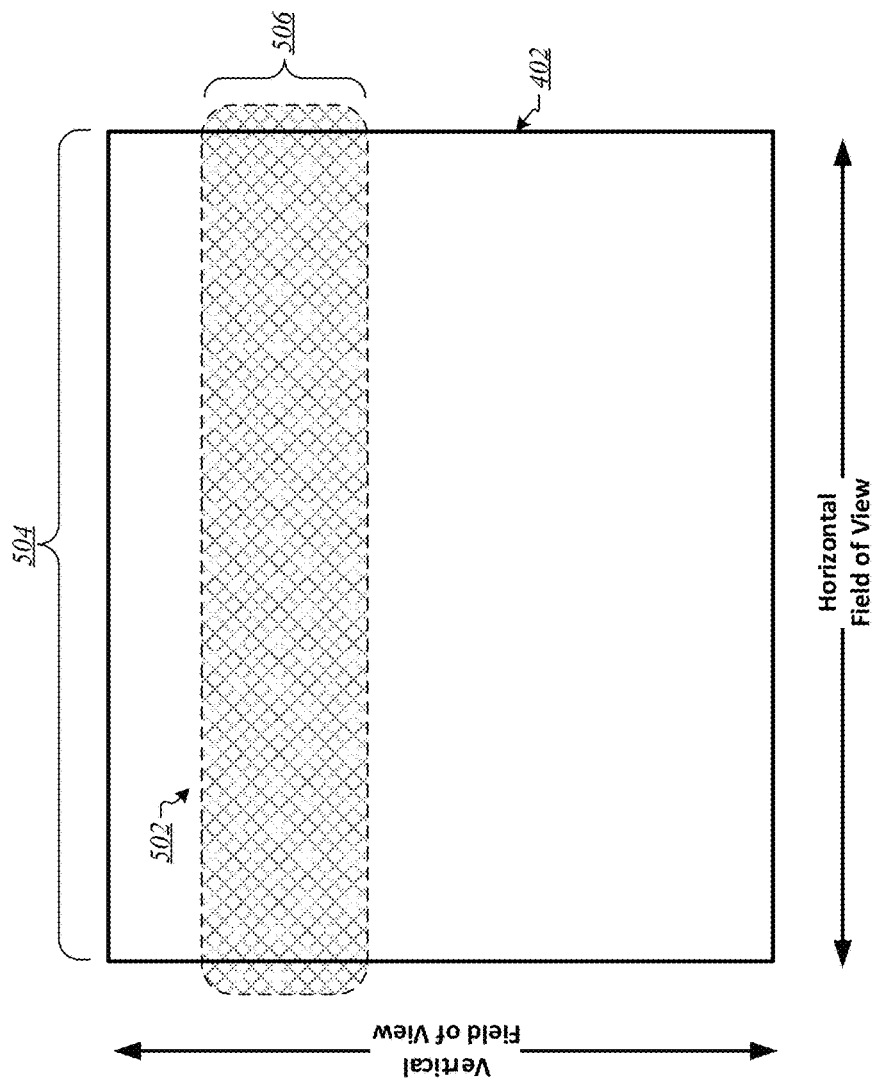
FIG. 5 illustrates a second operation of the first apparatus and/or the first system.

FIGS. 4 and 5 illustrate synchronized illumination with a rolling shutter camera. The synchronized illumination depicted in FIGS. 4 and 5 can be provided by the apparatus 300, the system 320, and/or can be provided by the rolling shutter synchronization techniques described herein.

As shown in FIGS. 4-5, a camera field of view 402 includes a horizontal field of view component and a vertical field of view component. The camera field of view 402 can represent the field of view for which a camera can capture an image.

FIG. 4 shows first illuminated region 404. The first illuminated region 404 can be a region or portion of the camera field of view 402 that is initially illuminated during operation of a rolling shutter. The first illuminated region 404 can extend beyond the camera field of view 402 but is not so limited. The first illuminated region 404 can provide illumination for a first horizontal portion 406 of the camera field of view 402 and for a first vertical portion 408 of the camera field of view 402. As shown in FIG. 4, the first horizontal portion 406 can substantially be the full horizontal component of the camera field of view 402 and the first vertical portion 408 can be significantly less than the full vertical component of the camera field of view 402 but is not so limited. For example, the first illuminated region 404 can illuminate less than the full horizontal component of the camera field of view 402 and/or can cover more of the full vertical component of the camera field of view 402.

The first illuminated region 404 can illuminate a portion of the camera field of view 402 that corresponds to image sensors of a camera that can substantially synchronously be undergoing image capture operations (e.g., one or more of reset, exposure, and readout). As an example, FIG. 4 can illustrate the first illuminated region 404 as illuminating a portion of the camera field of view 402 corresponding to image sensors that are substantially simultaneously being exposed.

FIG. 5 can represent illumination of a portion of the camera field of view 402 at a time later than a time represented by FIG. 4. For example, FIG. 5 can illustrate illumination of a second illumination region 502 that can be illuminated subsequent to illumination of the first illumination region 404 depicted in FIG. 4. The second illuminated region 502 can be a region or portion of the camera field of view 402 that is illuminated during operation of a rolling shutter. The second illuminated region 502 can extend beyond the camera field of view 402 but is not so limited. The second illuminated region 502 can provide illumination for a second horizontal portion 504 of the camera field of view 402 and for a second vertical portion 506 of the camera field of view 402. As shown in FIG. 5, the second horizontal portion 504 can substantially be the full horizontal component of the camera field of view 402 and the second vertical portion 506 can be significantly less than the full vertical component of the camera field of view 402 but is not so limited. For example, the second illuminated region 502 can illuminate less than the full horizontal component of the camera field of view 402 and/or can cover more of the full vertical component of the camera field of view 402.

The second illuminated region 502 can illuminate a portion of the camera field of view 402 that corresponds to image sensors of a camera that can substantially synchronously be undergoing image capture operations (e.g., one or more of reset, exposure, and readout). As an example, FIG. 5 can illustrate the second illuminated region 502 as illuminating a portion of the camera field of view 402 corresponding to image sensors that are substantially simultaneously being exposed.

The first illuminated region 404 and the second illuminated region 502 can be of substantially the same size (e.g., can cover substantially the same amount of area of the camera field of view 402) but are not so limited. Further, the first illuminated region 404 and the second illuminated region 502 can overlap. For example, the first illuminated region 404 can illuminate a portion of the camera field of view 402 that is illuminated by the second illuminated region 502. Alternatively, the first illuminated region 404 and the second illuminated region 502 can be non-overlapping. For example, the first illuminated region 404 can illuminate a portion of the camera field of view 402 that is not illuminated by the second illuminated region 502. That is, the first illuminated region 404 and the second illuminated region 502 can be distinct.

The first illuminated region 404 and the second illuminated region 502 can be provided by the movement of a light source such as, for example, the directional light source 308 depicted in FIG. 3A. As described in relation to FIG. 3A, the directional light source 308 can provide a beam of light that provides illumination of a portion of a camera's field of view. Further, the directional light source 308 can be controlled to provide the first illumination region 404 for a first period of time and then to provide the second illumination region 502 for a second period of time. The amount of time that the first illuminated region 404 and the second illuminated region 502 are provided can be substantially the same or can be different. As an example, the second illumination region 506 can be provided for a longer period of time than the first illumination region 404. Further, the first and second periods of time can overlap or can be non-overlapping.

The directional light source 308 can also be controlled to provide a smoothly varying illumination of the camera field of view 402 between sequentially illuminated regions. That is, the transition from the first illuminated region 404 and the second illuminated region 502 depicted in FIGS. 4 and 5 can be slowly varying, with illumination of the camera field of view varying substantially continuously between the first illuminated region 404 and the second illuminated region 502, rather than in discrete steps.

Figure 6:
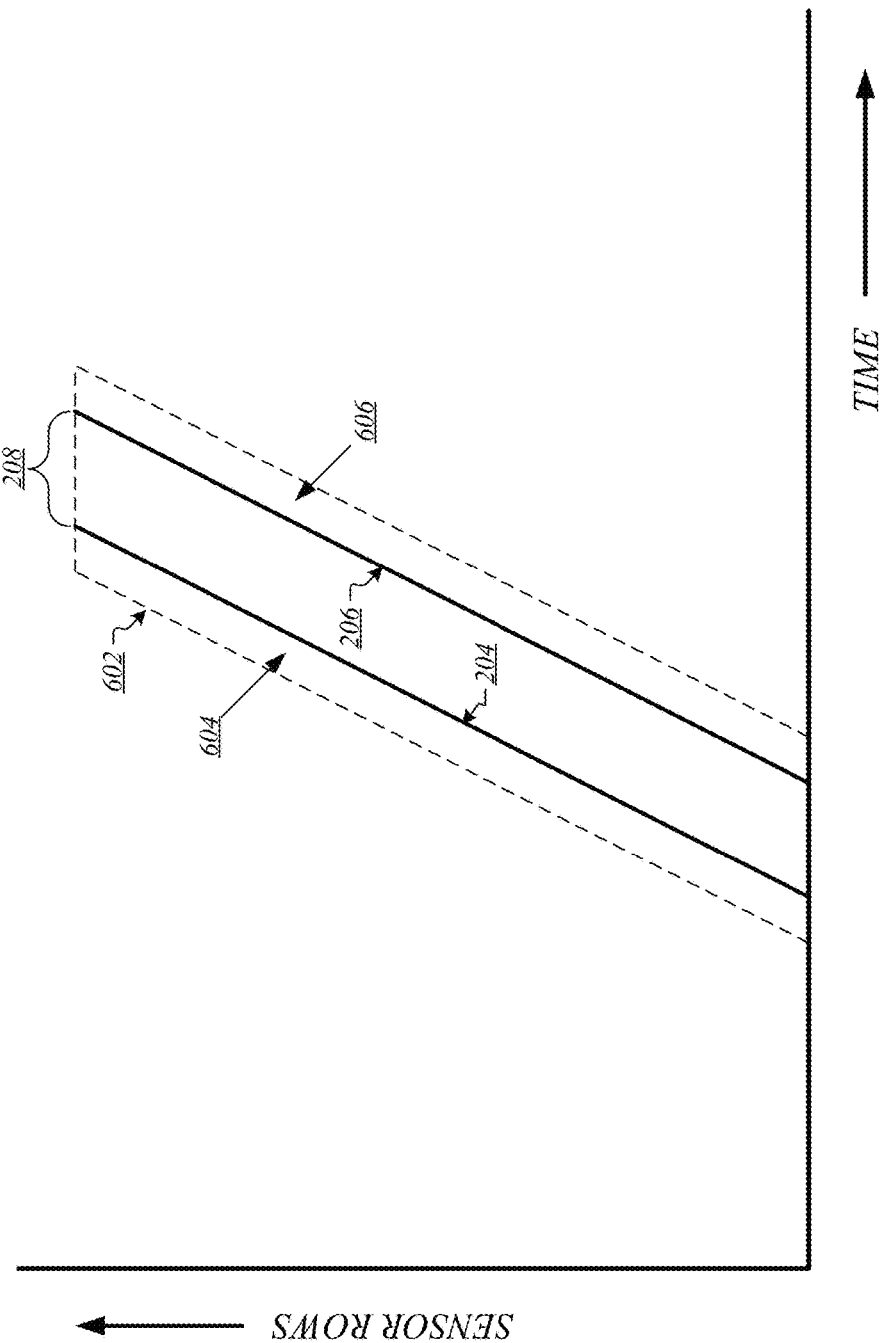
FIG. 6 illustrates flash light operation of the first apparatus and/or the first system.

FIG. 6 provides a representation 600 of operation of a dynamic flash light synchronized with a rolling shutter camera. The representation 600 can be indicative of the dynamic and synchronized flash light control provided by the apparatus 300, the system 320, and/or can be provided by the rolling shutter synchronization techniques described herein. As an example, the representation 600 can be indicative of synchronized illumination with a rolling shutter camera as depicted and described in relation to FIGS. 4 and 5.

As shown in FIG. 6, sensor row reset operation 204 occurs for each sensor row sequentially. Similarly, at a later time, sensor row readout operation 206 occurs for each sensor row sequentially. The image capture process can begin with a first row undergoing reset 204 and can end with a last row undergoing readout 206. In contrast to FIG. 2, however, flash light illumination 602 can be provided for all sensor lines more efficiently. Specifically, each sensor row can be illuminated for only a brief period of time prior to reset and for only a brief period of time after readout. The illumination periods prior to reset and after readout can be different amounts of time. Further, the illumination periods prior to reset and after readout can be can be relatively short periods of time as compared to the length of time between reset and readout. As a result, the effective flash light illumination 208 is more closely bounded by the flash light illumination 602 in comparison to the flash light illumination 202 as shown in FIG. 2. Consequently, flash light illumination is more efficient, as shown by the reduced extraneous flash light illumination indicated by region 604, bounded by flash light illumination 602 and reset 204, and by region 606, bounded by readout 206 and flash light illumination 602. In comparison to extraneous flash light illumination regions 210 and 212 of FIG. 2, extraneous flash light illumination regions 604 and 606 are smaller and therefore indicate more efficient use of the flash light. As an alternative to the operation depicted in FIG. 6, the illumination of each row can begin at substantially the same time as reset and can end at substantially the same time as readout, thereby nulling out extraneous flash light illumination regions 604 and 606.

Figure 7:
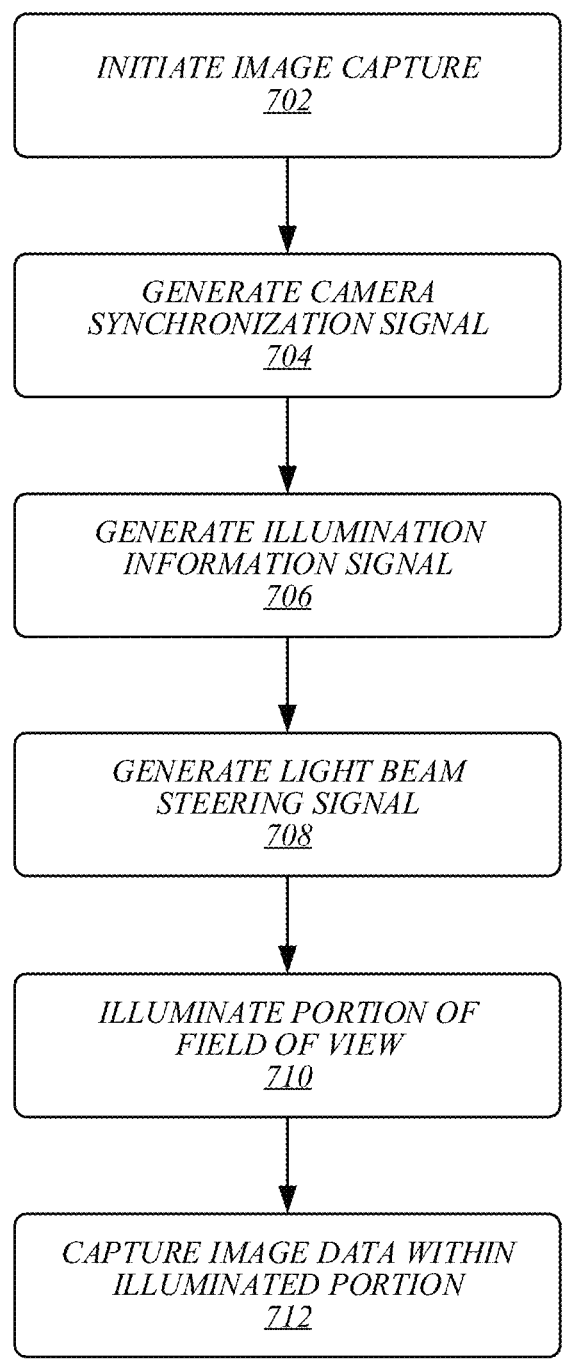
FIG. 7 illustrates an embodiment of a first logic flow.

FIG. 7 illustrates an embodiment of a logic flow 700, which may be representative of operations performed in some embodiments described herein. For example, logic flow 700 may be representative of operations that may be performed in various embodiments by apparatus 300 and/or system 320. The logic flow 700 can provide an image capture operation using a rolling shutter synchronized with a dynamic flash light.

At 702, an image capture operation is initiated. The image camera operation, for example, can be initiated by an operator or user of a camera or, for example, the apparatus 300. The image camera operation, for example, can be initiated by a user providing an input (e.g., pressing a button) indicating that an image within a camera's field is to be captured.

At 704, a camera synchronization signal can be generated. The camera synchronization signal can be generated based on the initiation of the image capture operation at 702. As an example, the camera synchronization signal can indicate that an image capture operation is underway or about to be implemented. The camera synchronization signal can be generated prior to any reset, exposure, or readout operation of a rolling shutter of a camera and can indicate that such operations are imminent. The camera synchronization signal can be provided by a camera or other device implementing rolling shutter operations or can be provided by any device responsive to the image camera initiation at 702. The camera synchronization signal can be provided to a controller of a camera and/or a device capable of directing operation of the camera and/or capable of directly or indirectly specifying operation of a direction light source (e.g., the direction light source 308).

At 706, an illumination information signal can be generated. The illumination information signal can be generated based on generation and/or reception of the camera synchronization signal. The illumination information signal can specify operation of a directed light source based on the image capture operation initiated at 702. As an example, the illumination information signal can include an illumination pattern to be implemented by a dynamic directed light source. The illumination pattern can specify regions of a field of the camera to be illuminated in synchronization with the rolling shutter image capture operation of the camera. For example, the illumination pattern can specify the duration and sequence of illumination of specific regions or portions of the field of view of the camera.

The illumination pattern can be based on a number of factors related to the characteristics of the rolling shutter operation of the camera and/or the characteristics of the image capture operation. For example, the illumination pattern can be based on the field of view of the camera, characteristic of the image to be captured (e.g., motion or speed of the image, lighting of the image, color of the image), a clock rate of the rolling shutter operation of the camera, the particular operation of the rolling shutter camera, and any delays associated with components implementing the illumination of the camera's field of view. The illumination information signal can be provided to a controller of the directed light source.

At 708, a light beam steering signal can be generated. The light beam steering signal can specify movement of the directed light source. In particular, the light beam steering signal can specify the change in movement or direction of the directed light source so as to provide the sequential illumination of the regions of the camera's field of view in accordance with the illumination pattern. The light beam steering signal can be based on the illumination pattern. As an example, the light beam steering signal can specify a rotational, distal, and/or angular movement or motion of the directed light source sufficient to illuminate regions of the camera's field of view in substantial synchronization with rolling shutter operations (e.g., one or more of reset, exposure, and/or readout) of a camera. The light beam steering signal can be provided to the directed light source.

At 710, a portion of the camera's field of view can be illuminated. Illumination can be provided by the directed light source. The directed light source can provide a light beam or light source to illuminate the specific region based on the received light beam steering signal. The portion of the field of view illuminated can be determined based on the controlled direction of the directed light source. The portion of the camera's field of view that is illuminated can be substantially synchronized with the rolling shutter image capture operations of the camera. The directed light source can illuminate a section of the field of view that is currently undergoing image capture operations of the rolling shutter (e.g., exposure). For example, the illuminated section can correspond to image sensors currently undergoing reset, exposure, and/or readout operations to effectuate image capture within the illuminated region of the camera's field of view. The illuminated section of the field of view can be any portion of the camera's field of view.

At 712, the portion of the camera's field of view illuminated at 710 can be captured as a portion of an image. Image capture operations can include reset, exposure, and/or readout operations performed with image sensors corresponding to the illuminated section. In some embodiments, image capture can include storing data generated by the image sensors in a memory (e.g., the memory 312). Steps 708-712 can be repeated for each section of the camera's field of view that is to be illuminated based on the illumination pattern generated or provided with the illumination information signal at 706. In doing so, as an example, sequential operations can be performed to control the movement of a directed light source (e.g., to adjust a direction in which a light beam is provided), to illuminate a particular section of a camera's field of view, and to capture image data corresponding to the illuminated portion of the camera's field of view. These sequential operations can be repeated until all sections of the camera's field of view have been illuminated and have substantially synchronously been captured and or recorded as image data (e.g., in such form that it can be reproduced).

Figure 8:
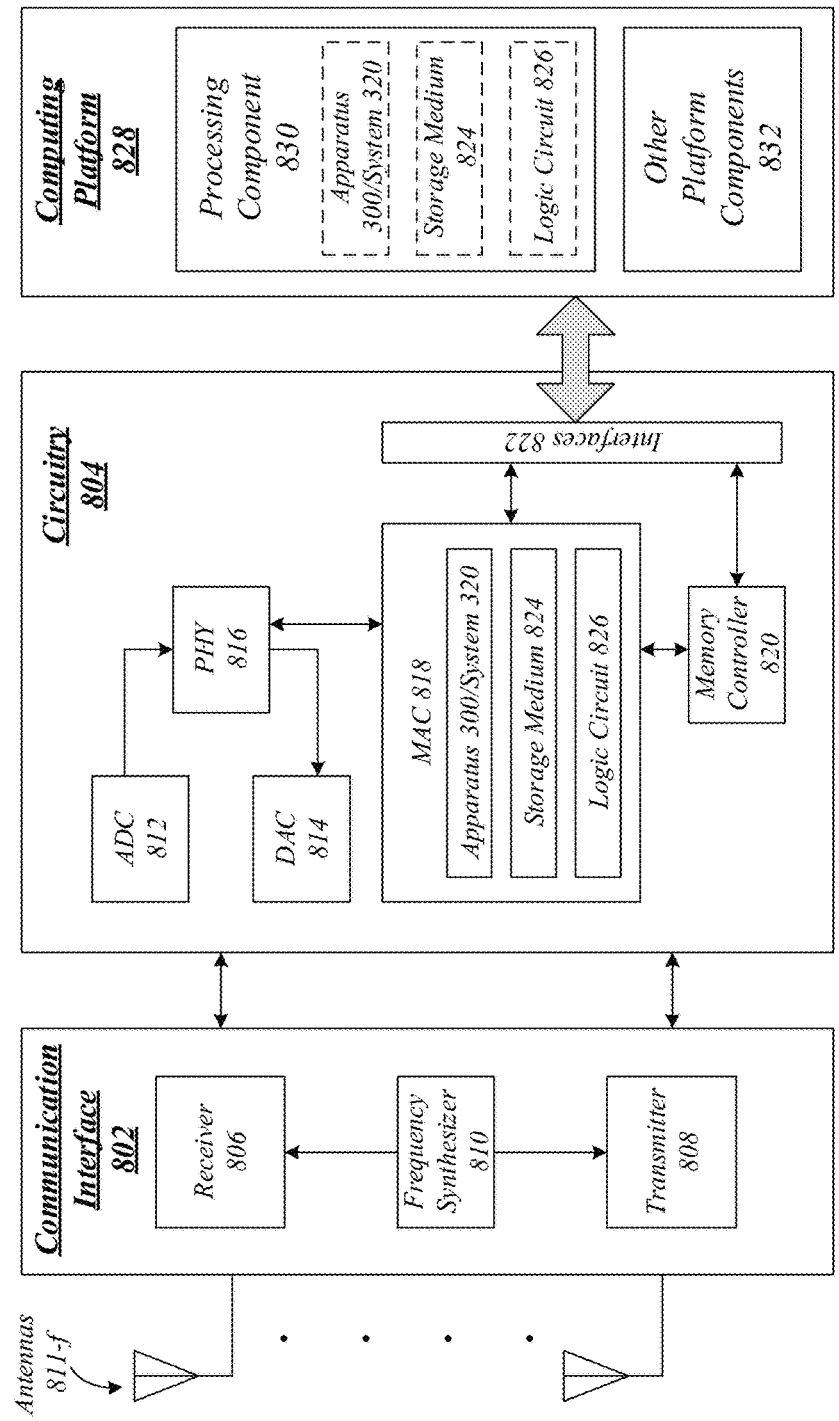
FIG. 8 illustrates an embodiment of a device.

FIG. 8 illustrates an embodiment of a device 800 that may implement one or more of apparatus 300 of FIG. 3A, or any portion thereof—including one or more components of apparatus 300 of FIG. 3A including camera 302, directed illumination controller 306, and/or directed light source 308—system 320 of FIG. 3B, or any portion thereof, or logic flow 700 of FIG. 7, or any portion thereof.

As shown in FIG. 8, the device 800 can include a storage medium 824. The storage medium 824 may comprise any non-transitory computer-readable storage medium or machine-readable storage medium, such as an optical, magnetic or semiconductor storage medium. In various embodiments, the storage medium 824 may comprise an article of manufacture. In some embodiments, the storage medium 824 may store computer-executable instructions, such as computer-executable instructions to implement one or more of the operations described in relation to apparatus 300 of FIG. 3A, system 320 of FIG. 3B, and/or logic flow 700 of FIG. 7, for example. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

In various embodiments, device 800 may comprise a logic circuit 826. The logic circuit 826 may include physical circuits to perform operations described for apparatus 300 of FIG. 3A, system 320 of FIG. 3B, storage medium 824, and/or logic flow 700 of FIG. 7, for example. As shown in FIG. 8, device 800 may include a communication interface 802, circuitry 804, and computing platform 828, although the embodiments are not limited to this configuration.

The device 800 may implement some or all of the structure and/or operations for one or more of apparatus 300 of FIG. 3A, system 320 of FIG. 3B, storage medium 824, and/or logic flow 700 of FIG. 7 in a single computing entity, such as entirely within a single device. Alternatively, the device 800 may distribute portions of the structure and/or operations for one or more of apparatus 300 of FIG. 3A, system 320 of FIG. 3B, storage medium 824, and/or logic flow 700 of FIG. 7 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In various embodiments, communication interface 802 may include a component or combination of components adapted for transmitting and receiving communication messages over one or more wired or wireless interfaces according to one or more communication standard protocols, such as wireless mobile broadband technologies. For example, various embodiments may involve transmission and/or reception by communication interface 802 over one or more wireless connections according to one or more 3rd Generation Partnership Project (3GPP), 3GPP Long Term Evolution (LTE), and/or 3GPP LTE-Advanced (LTE-A) technologies and/or standards, including their revisions, progeny and variants. Various embodiments may additionally or alternatively involve transmissions according to one or more Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS) technologies and/or standards, including their revisions, progeny and variants.

Examples of wireless mobile broadband technologies and/or standards may also include, without limitation, any of the Institute of Electrical and Electronics Engineers (IEEE) 802.16 wireless broadband standards such as IEEE 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1xRTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their revisions, progeny and variants.

Some embodiments may additionally or alternatively involve wireless communications according to other wireless communications technologies and/or standards. Examples of other wireless communications technologies and/or standards that may be used in various embodiments may include, without limitation, other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, and/or IEEE 802.11ah standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any revisions, progeny, and/or variants of any of the above. The embodiments are not limited to these examples.

In addition to transmission and/or reception over one or more wireless connections, various embodiments may involve transmission and/or reception by communication interface 802 over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

As an example, the communications interface 802 may be a radio interface (e.g., an RF radio interface) having one or more RF transceivers. As an RF interface, the communications interface 802 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. The communications interface 802 may include, for example, a receiver 806 and a transmitter 808. The receiver 806 and transmitter 808 can together be considered a transceiver and can be adapted for communications over a wireless and/or wired communications interface as described above. As a radio interface, the communications interface 802 may also include a frequency synthesizer 810. As a radio interface, the communications interface 802 may include bias controls, a crystal oscillator and/or one or more antennas 811-*f*. In another embodiment as a radio interface, the communications interface 802 may use external voltage-controlled oscillators (VCOs), surface acoustic wave filters, intermediate frequency (IF) filters and/or RF filters, as desired. Due to the variety of potential RF interface designs an expansive description thereof is omitted.

Circuitry 804 may communicate with communications interface 802 to process, receive and/or transmit signals. The circuitry 804 may include an analog-to-digital converter (ADC) 812 and a digital-to-analog converter (DAC) 814. In some embodiments for the communications interface 802 implemented as a radio interface, the ADC 812 can be used for down converting received signals and the DAC 814 can be used for up converting signals for transmission. The circuitry 804 may include a baseband or physical layer (PHY) processing circuit 816 for PHY link layer processing of respective receive/transmit signals. The circuitry 804 may include, for example, a medium access control (MAC) processing circuit 818 for MAC/data link layer processing. The circuitry 804 may include a memory controller 820 for communicating with MAC processing circuit 818 and/or a computing platform 828, for example, via one or more interfaces 822.

In some embodiments, PHY processing circuit 816 may include a frame construction and/or detection module, in combination with additional circuitry such as a buffer memory, to construct and/or deconstruct communication frames. Alternatively or in addition, MAC processing circuit 818 may share processing for certain of these functions or perform these processes independent of PHY processing circuit 816. In some embodiments, MAC and PHY processing may be integrated into a single circuit.

The computing platform 828 may provide computing functionality for the device 800. As shown, the computing platform 828 may include a processing component 830. In addition to, or alternatively of the circuitry 804, the device 800 may execute processing operations or logic for one or more of apparatus 300 of FIG. 3A, system 320 of FIG. 3B, storage medium 824, logic flow 700 of FIG. 7, and/or logic circuit 826 using the processing component 830.

The processing component 830 (and/or PHY 816 and/or MAC 818) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 828 may further include other platform components 832. Other platform components 832 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 800 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, digital camera or camcorder, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, eNB, PDN-GW, TWAG, eDPG, subscriber station, mobile subscriber center, radio network controller, router, hub, gateway, bridge, switch, machine, or combination thereof. Accordingly, functions and/or specific configurations of device 800 described herein, may be included or omitted in various embodiments of device 800, as suitably desired.

Embodiments of device 800 may be implemented using single input single output (SISO) architectures. However, certain implementations may include multiple antennas (e.g., antennas 811-f) for transmission and/or reception using adaptive antenna techniques for beamforming or spatial division multiple access (SDMA) and/or using MIMO communication techniques.

The components and features of device 800 may be implemented using any combination of discrete circuitry, application specific integrated circuits (ASICs), logic gates and/or single chip architectures. Further, the features of device 800 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 800 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 9:
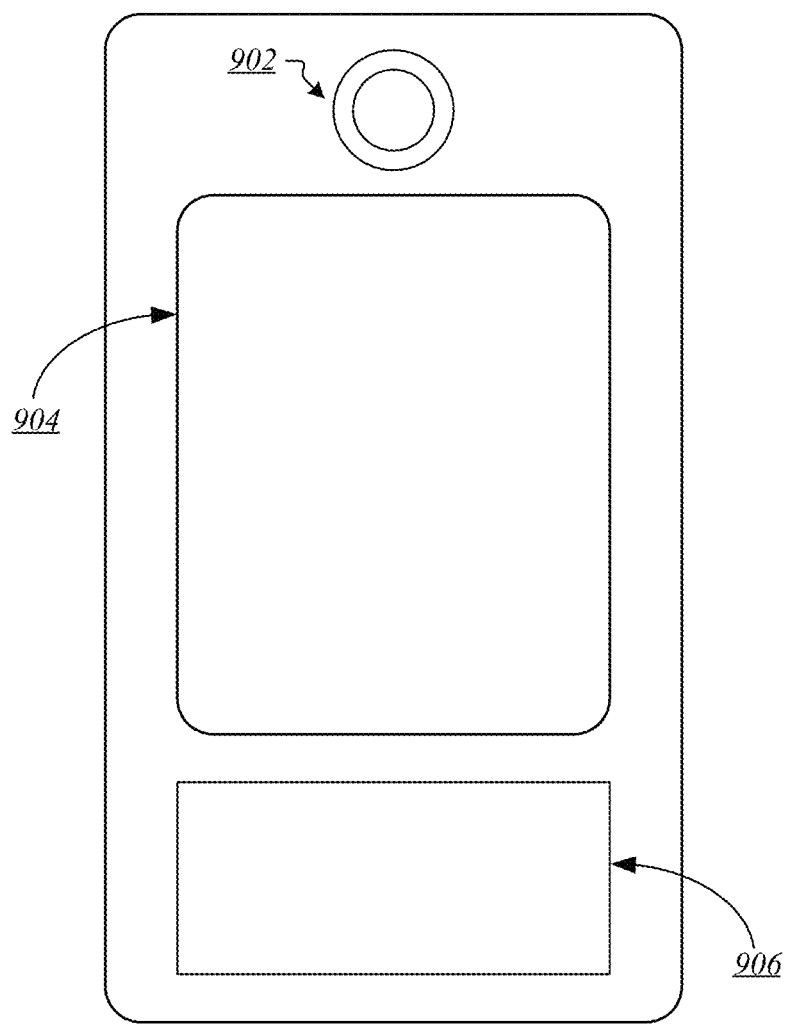
FIG. 9 illustrates an embodiment a second device.

FIG. 9 illustrates an example computing device 900. The computing device 900 can be an exemplary implementation of the device 800. As an example, the computing device 900 can be a mobile telephone, a smart phone, a tablet, a notebook computer, a netbook, or an ultra-mobile computer, or other handheld device. The computing device 900 can include an integrated camera 902. The computing device 900 can implement one or more of apparatus 300 of FIG. 3A, or any portion thereof—including one or more components of apparatus 300 of FIG. 3A including camera 302 (e.g., as integrated camera 902), directed illumination controller 306, and/or directed light source 308—system 320 of FIG. 3B, or any portion thereof, logic flow 700 of FIG. 7, or any portion thereof, storage medium 824 or logic circuit of FIG. 8, or logic flow 700 of FIG. 7. As an example, computing device 900 can implement apparatus 300 of FIG. 3A or system 320 of FIG. 3B and can implement processing unit 304 as part of a processing unit of computing device 900 that implements one or more additional features of operations of computing device 900.

FIG. 9 can illustrate a front view of the computing device 900. As shown in FIG. 9, computing device can include a display 904. The display 904 may comprise any display device capable of displaying information received from a processor of the computing device 900 including from processing unit 304. Examples for display 904 may include a television, a monitor, a projector, and a computer screen. In one embodiment, for example, display 904 may be implemented by a liquid crystal display (LCD), light emitting diode (LED) or other type of suitable visual interface.

Display 904 may comprise, for example, a touch-sensitive display screen ("touchscreen"). In some implementations, display 904 may comprise one or more thin-film transistors (TFT) LCD including embedded transistors. The embodiments, however, are not limited to these examples.

The display 904 can display an image for capture by the camera 902. For example, the computing device 900 can provide an image on display 904 representative of the field of view of the camera 902. The computing device 900 can include a user interface 906. The user interface 906 can include any user input device including a keyboard, a keypad, or navigation buttons or interfaces to enable a user of the computing device 900 to provide input or data to the computing device 900. The display 904 can also provide a user interface or can supplement the user interface 906.

As an example, a user of the computing device 900 can select a camera function of the computing device 900 using the display/user interface 904. After doing so, the computing device 900 can provide an image on display 904 representative of the field of view of the camera 902. The user can then use user interface 906 to initiate an image capture operation (e.g., the image capture operation 702 of FIG. 7).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments. In the following embodiments and in the descriptions provided throughout, a "signal" can be a message or information—for example, generated, transmitted, received and/or processed to facilitate the exchange of information.

The following examples pertain to further embodiments:

Example 1 is an apparatus, comprising a camera including a rolling shutter and a directional light source to sequentially illuminate portions of a field of view of the camera, wherein the rolling shutter substantially synchronously captures image data within the sequentially illuminated portions of the field of view.

Example 2 is an extension of Example 1, wherein the directional light source illuminates a first portion of the field of view during a first period of time and illuminates a second portion of the field of view during a second period of time.

Example 3 is an extension of Example 2, wherein the first and second periods of time are non-overlapping.

Example 4 is an extension of Example 2, wherein the first and second periods of time are overlapping.

Example 5 is an extension of Example 2, wherein the rolling shutter captures first image data during the first period of time and captures second image data during the second period of time.

Example 6 is an extension of Example 5, wherein the first image data corresponds to the first illuminated portion of the field of view and the second image data corresponds to the second illuminated portion of the field of view.

Example 7 is an extension of Example 6, wherein the first illuminated portion of the field of view and the second illuminated portion of the field of view overlap.

Example 8 is an extension of Example 6, wherein the first illuminated portion of the field of view and the second illuminated portion of the field are non-overlapping.

Example 9 is an extension of Example 1, further comprising a processing unit, wherein the processing unit generates an illumination information signal indicating the portions of the field of view to be illuminated by the directional light source.

Example 10 is an extension of Example 9, wherein generation of the illumination information signal is triggered based on a camera synchronization signal provided by the camera.

Example 11 is an extension of Example 10, wherein the camera synchronization signal is provided by the camera prior to image capture by the rolling shutter.

Example 12 is an extension of Example 11, wherein the camera synchronization signal is generated based on a user input.

Example 13 is an extension of Example 9, wherein the illumination information signal comprises an illumination pattern of the directional light source.

Example 14 is an extension of Example 13, wherein the processing unit generates the illumination pattern signal based on the field of view of the camera.

Example 15 is an extension of Example 13, wherein the processing unit generates the illumination pattern based on a clock rate of the rolling shutter.

Example 16 is an extension of Example 13, wherein the illumination pattern indicates sequential sections of the field of view to be illuminated.

Example 17 is an extension of Example 16, wherein the sequential sections of the field of view of the camera to be illuminated are overlapping.

Example 18 is an extension of Example 16, wherein the sequential sections of the field of view of the camera to be illuminated are non-overlapping.

Example 19 is an extension of Example 9, further comprising a directional illumination controller, wherein the directional illumination controller generates a light beam steering signal based on the illumination information signal to control movement of the directional light source.

Example 20 is an extension of Example 19, wherein the movement of the direction light source is continuously varied.

Example 21 is an extension of Example 19, wherein the movement of the direction light source is discretely varied.

Example 22 is an extension of Example 1, wherein the directional light source provides a steerable beam of light within the field of view of the camera.

Example 23 is an extension of Example 22, wherein the directional light source comprises a micro-electromechanical systems (MEMS) based mirror.

Example 24 is an extension of Example 22, wherein the directional light source comprises a liquid crystal grating.

Example 25 is an extension of Example 25, wherein the directional light source comprises an optical phased array.

Example 26 is an extension of Example 1, wherein the rolling shutter captures image data within the portion of the field of view illuminated by the directional light source.

Example 27 is an extension of Example 26, wherein the illuminated portion of the field of view comprises a full horizontal field of view of the camera and a portion of a full vertical field of view of the camera.

Example 28 is an extension of Example 26, wherein the illuminated portion of the field of view comprises a full vertical field of view of the camera and a portion of a full horizontal field of view of the camera.

Example 29 is an extension of Example 1, wherein the image data is video data.

Example 30 is a system comprising an apparatus of any of examples 1 to 29, a transceiver, a user interface, and a display.

Example 31 is a method, comprising generating a camera synchronization signal, generating an illumination information signal based on the camera synchronization signal, sequentially illuminating portions of a field of view of a camera based on the illumination information signal, and capturing image data within the sequentially illuminated portions of the field of view.

Example 32 is an extension of Example 31, further comprising generating a light beam steering signal based on the illumination information signal.

Example 33 is an extension of Example 32, further comprising controlling movement of a directional light source based on the light beam steering signal.

Example 34 is an extension of Example 33, wherein generating an illumination information signal comprises generating an illumination pattern of the directional light source.

Example 35 is an extension of Example 34, wherein the illumination pattern is generated based on the field of view of the camera.

Example 36 is an extension of Example 34, wherein the illumination pattern is generated based on a clock rate of a rolling shutter.

Example 37 is an extension of Example 34, wherein the illumination pattern is generated based on a delay associated with a controller of the direction light source.

Example 38 is an extension of Example 34, wherein the illumination pattern is generated based on a delay associated with generation of the illumination information signal.

Example 39 is an extension of Example 34, wherein the illumination pattern indicates sequential sections of the field of view to be illuminated.

Example 40 is an extension of Example 39, wherein the sequential sections are overlapping.

Example 41 is an extension of Example 39, wherein the sequential sections are non-overlapping.

Example 42 is an extension of Example 31, further comprising capturing image data using a rolling shutter.

Example 43 is an extension of Example 31, wherein sequentially illuminating further comprises illuminating a first portion of the field of view during a first period of time and illuminating a second portion of the field of view during a second period of time.

Example 44 is an extension of Example 31, wherein capturing image data further comprises capturing first image data during the first period of time and capturing second image data during the second period of time.

Example 45 is at least one non-transitory computer-readable storage medium comprising a set of instructions that, in response to being executed on a computing device, cause the computing device to perform a method according to any of Examples 31 to 43.

Example 46 is an apparatus comprising means for performing a method according to any of Examples 31 to 43.

Example 47 is an apparatus, comprising logic, at least a portion of which is in hardware, to sequentially illuminate portions of a camera field of view and to capture image data of the sequentially illuminated portions of the camera field of view.

Example 48 is an extension of Example 47, the logic to sequentially illuminate the portions of the camera field of view and to capture the image data substantially synchronously.

Example 49 is an extension of Example 47, wherein the captured image data is video data.

Example 50 is an extension of Example 47, the logic to generate a camera synchronization signal.

Example 51 is an extension of Example 50, the logic to generate the camera synchronization signal based on a user input.

Example 52 is an extension of Example 51, wherein the user input indicates initiation of an image capture operation.

Example 53 is an extension of Example 47, the logic to generate an illumination information signal.

Example 54 is an extension of Example 53, the logic to generate the illumination information signal based on a camera synchronization signal.

Example 55 is an extension of Example 53, the logic to generate a light beam steering signal based on the illumination information signal.

Example 56 is an extension of Example 55, the logic to control movement of a directional light source based on the light beam steering signal.

Example 57 is an extension of Example 56, the logic to control continuous movement of the directional light source.

Example 58 is an extension of Example 56, the logic to control discrete movement of the directional light source.

Example 59 is an extension of Example 56, the illumination information signal comprising an illumination pattern of the directional light source.

Example 60 is an extension of Example 59, the logic to generate the illumination pattern based on the camera field of view.

Example 61 is an extension of Example 59, the logic to generate the illumination pattern based on a clock rate of a rolling shutter.

Example 62 is an extension of Example 59, the logic to generate the illumination pattern based on a delay associated with generation of the illumination information signal.

Example 63 is an extension of Example 59, wherein the illumination pattern indicates sequential sections of the camera field of view to be illuminated.

Example 64 is an extension of Example 63, wherein the sequential sections are overlapping.

Example 65 is an extension of Example 63, wherein the sequential sections are non-overlapping.

Example 66 is an extension of Example 47, the logic to capture the image data using a rolling shutter.

Example 67 is an extension of Example 47, the logic to illuminate a first portion of the camera field of view during a first period of time and to illuminate a second portion of the camera field of view during a second period of time.

Example 68 is an extension of Example 67, the logic to capture first image data during the first period of time and to capture second image data during the second period of time.

Example 69 is an extension of Example 47, further comprising a user interface.

Example 70 is an extension of Example 47, further comprising a display.

Example 71 is an extension of Example 47, further comprising a transceiver.

Example 72 is an extension of Example 71, wherein the transceiver is a radio frequency (RF) transceiver.

Example 73 is an extension of Example 47, further comprising a display.

Example 74 is a system comprising an apparatus according to any of Examples 47 to 68, a radio frequency (RF) transceiver, a user interface, and a display.

Example 75 is at least one non-transitory computer-readable storage medium comprising a set of instructions that, in response to being executed at computing device, cause the computing device to sequentially illuminate portions of a camera field of view and capture image data of the sequentially illuminated portions of the camera field of view.

Example 76 is an extension of Example 75, comprising instructions that, in response to being executed at the computing device, cause the computing device to sequentially illuminate the portions of the camera field of view and to capture the image data substantially synchronously.

Example 77 is an extensions of Example 75, wherein the captured image data is video data.

Example 78 is an extension of Example 75, comprising instructions that, in response to being executed at the computing device, cause the computing device to generate a camera synchronization signal.

Example 79 is an extension of Example 78, comprising instructions that, in response to being executed at the computing device, cause the computing device to generate the camera synchronization signal based on a user input.

Example 80 is an extension of Example 79, wherein the user input indicates initiation of an image capture operation.

Example 81 is an extensions of Example 75, comprising instructions that, in response to being executed at the computing device, cause the computing device to generate an illumination information signal.

Example 82 is an extensions of Example 81, comprising instructions that, in response to being executed at the computing device, cause the computing device to generate the illumination information signal based on a camera synchronization signal.

Example 83 is an extensions of Example 81, comprising instructions that, in response to being executed at the computing device, cause the computing device to generate a light beam steering signal based on the illumination information signal.

Example 84 is an extensions of Example 83, comprising instructions that, in response to being executed at the computing device, cause the computing device to control movement of a directional light source based on the light beam steering signal.

Example 85 is an extensions of Example 84, comprising instructions that, in response to being executed at the computing device, cause the computing device to control continuous movement of the directional light source.

Example 86 is an extensions of Example 84, comprising instructions that, in response to being executed at the computing device, cause the computing device to control discrete movement of the directional light source.

Example 87 is an extensions of Example 81, wherein the illumination information signal includes an illumination pattern of the directional light source.

Example 88 is an extensions of Example 87, comprising instructions that, in response to being executed at the computing device, cause the computing device to generate the illumination pattern based on the camera field of view.

Example 89 is an extensions of Example 87, comprising instructions that, in response to being executed at the computing device, cause the computing device to generate the illumination pattern based on a clock rate of a rolling shutter.

Example 90 is an extensions of Example 87, comprising instructions that, in response to being executed at the computing device, cause the computing device to generate the illumination pattern based on a delay associated with generation of the illumination information signal.

Example 91 is an extensions of Example 87, wherein the illumination pattern indicates sequential sections of the camera field of view to be illuminated.

Example 92 is an extensions of Example 91, wherein the sequential sections are overlapping.

Example 93 is an extensions of Example 91, wherein the sequential sections are non-overlapping.

Example 94 is an extensions of Example 75, comprising instructions that, in response to being executed at the computing device, cause the computing device to capture the image data using a rolling shutter.

Example 95 is an extensions of Example 94, comprising instructions that, in response to being executed at the computing device, cause the computing device to illuminate a first portion of the camera field of view during a first period of time and to illuminate a second portion of the camera field of view during a second period of time.

Example 96 is an extensions of Example 95, comprising instructions that, in response to being executed at the computing device, cause the computing device to capture first image data during the first period of time and to capture second image data during the second period of time.

Example 97 is an apparatus, comprising a processor circuit and a camera manager component for execution by the processor circuit, the camera manager component comprising a camera synchronizer component to generate camera synchronization information, an illumination component to generate illumination information based on the camera synchronization information, the illumination information to cause sequential illumination of portions of a field of view of a camera, and a steering component to generate light beam steering information based on the illumination information, the light beam steering information to control movement of a light beam of a directional light source.

Example 98 is an extension of Example 97, comprising a camera control component to control the camera and to cause the camera to capture image data within the sequentially illuminated portions of the field of view of the camera.

Example 99 is an extension of Example 97, wherein the camera synchronization information indicates initiation of an image capture operation.

Example 100 is an extension of Example 97, wherein the camera synchronization information indicates the field of view of the camera.

Example 101 is an extension of Example 97, wherein the camera synchronization information is generated based on receipt of a user input.

Example 102 is an extension of Example 97, wherein the illumination information indicates sequential sections of the field of view of the camera to be illuminated.

Example 103 is an extension of Example 102, wherein the light beam steering information indicates a position of the light beam within the field of view of the camera for each of the sequential sections of the field of view of the camera to be illuminated.

Example 104 is a system, comprising an apparatus according to any of Examples 97 to 103 and at least one of a transceiver, a user interface, a display, a camera, a memory unit, a memory controller, and a directional light source.

Example 105 is a method, comprising generating camera synchronization information, generating illumination information based on the camera synchronization information, the illumination information indicating sequential sections of a field of view of a camera to be illuminated, and generating light beam steering information based on the illumination information, the light beam steering information to control movement of a light beam of a directional light source to illuminate the sequential sections of the field of view of the camera.

Example 106 is an extension of Example 105, further comprising controlling the camera to capture image data within the sequentially illuminated portions of the field of view of the camera.

Example 107 is an extension of Example 105, the camera synchronization information indicating initiation of an image capture operation.

Example 108 is an extension of Example 105, the camera synchronization information indicating the field of view of the camera.

Example 109 is an extension of Example 105, wherein generating the camera synchronization information is based on receipt of a user input.

Example 110 is an extension of Example 105, the light beam steering information indicating a position of the light beam within the field of view of the camera for each of the sequential sections of the field of view of the camera to be illuminated.

Example 111 is at least one non-transitory computer-readable storage medium comprising a set of instructions that, in response to being executed on a computing device, cause the computing device to perform a method according to any of examples 105 to 110.

Example 112 is an apparatus, comprising means for performing a method according to any of examples 105 to 110.

Example 113 is at least one non-transitory computer-readable storage medium comprising a set of instructions that, in response to being executed at computing device, cause the computing device to generate camera synchronization information, generate illumination information based on the camera synchronization information, the illumination information indicating sequential sections of a field of view of a camera to be illuminated, and generate light beam steering information based on the illumination information, the light beam steering information to control movement of a light beam of a directional light source to illuminate the sequential sections of the field of view of the camera.

Example 114 is an extension of Example 113, comprising instructions that, in response to being executed at the computing device, cause the computing device to control the camera to capture image data within the sequentially illuminated portions of the field of view of the camera.

Example 115 is an extension of Example 113, the camera synchronization information indicating initiation of an image capture operation.

Example 116 is an extension of Example 113, the camera synchronization information indicating the field of view of the camera.

Example 117 is an extension of Example 113, comprising instructions that, in response to being executed at the computing device, cause the computing device to generate the camera synchronization information based on receipt of a user input.

Example 118 is an extension of Example 113, the light beam steering information indicating a position of the light beam within the field of view of the camera for each of the sequential sections of the field of view of the camera to be illuminated.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   a directed light source comprising:
      a light source to provide a light beam; and
      steering optics to change a direction of the light beam;
   processor circuit coupled to the directed light source; and
   a memory to store instructions, which when executed by the processor circuit, cause the processor circuit to:
      generate camera synchronization information based on a rolling shutter rate of a digital camera, the digital camera comprising a plurality of image sensor elements arranged in a plurality sensor lines, the rolling shutter rate to indicate a pattern of sequentially resetting a one of the plurality of sensor lines, exposing the one of the plurality of sensor lines to light at least twice and reading out light exposure information from the one of the plurality of sensor lines;

generate illumination information, the illumination information to include indications of a plurality of regions of a field of view of the digital camera to sequentially illuminate based on the rolling shutter rate and the pattern; and generate a light beam steering signal based on the illumination information, the light beam steering signal to cause the steering optics to change a direction of the light beam to move the light beam in at least one of a horizontal or a vertical direction to sequentially illuminate the plurality of regions of the field of view.

2. The apparatus of claim 1, the instructions, which when executed by the processor circuit, cause the processor circuit to generate a camera control signal to cause the camera to capture image data within the sequentially illuminated portions of the field of view of the camera.

3. The apparatus of claim 1, wherein the camera synchronization information indicates initiation of an image capture operation.

4. The apparatus of claim 1, wherein the camera synchronization information indicates the field of view of the camera.

5. The apparatus of claim 1, wherein the illumination information indicates sequential sections of the field of view of the camera to be illuminated.

6. The apparatus of claim 5, wherein the light beam steering information indicates a position of the light beam within the field of view of the camera for each of the sequential sections of the field of view of the camera to be illuminated.

7. The apparatus of claim 1, comprising the digital camera coupled to the processor circuit, the steering optics comprising a micro-electromechanical systems mirror, a liquid crystal grating, or an optical phased array.

8. The apparatus of claim 1, the pattern comprising:
resetting, at a first time, light exposure information for the plurality of light sensor elements of the first sensor line;
exposing, at a second time, the plurality of light sensor elements of the first sensor line to light;
resetting, at the second time, light exposure information for the plurality of light sensor elements of a second sensor line adjacent to the first sensor line;
exposing, at a third time, the plurality of light sensor elements of the first sensor line and the second sensor line to light; and
reading, at a fourth time, out the light exposure information from the plurality of light sensor elements of the first sensor line.

9. A method, comprising:
generating camera synchronization information based on a rolling shutter rate of a digital camera, the digital camera comprising a plurality of image sensor elements arranged in a plurality sensor lines, the rolling shutter rate to indicate a pattern of sequentially resetting a one of the plurality of sensor lines, exposing the one of the plurality of sensor lines to light at least twice and reading out light exposure information from the one of the plurality of sensor lines;
generating illumination information based on the rolling shutter rate and the pattern, the illumination information indicating sequential sections of a field of view of the digital camera to be illuminated; and
generating a light beam steering signal based on the illumination information, the light beam steering signal to include an indication to cause a directional light source to emit a light beam and to cause a movement of the light beam in at least one of a horizontal or a vertical direction to illuminate the sequential sections of the field of view of the camera.

10. The method of claim 9, further comprising controlling the camera to capture image data within the sequentially illuminated sections of the field of view of the camera.

11. The method of claim 9, the camera synchronization information indicating initiation of an image capture operation.

12. The method of claim 9, the camera synchronization information indicating the field of view of the camera.

13. The method of claim 9, wherein generating the camera synchronization information is based on receipt of a user input.

14. The method of claim 9, the light beam steering information indicating a position of the light beam within the field of view of the camera for each of the sequential sections of the field of view of the camera to be illuminated.

15. At least one non-transitory computer-readable storage medium comprising a set of instructions that, in response to being executed at a computing device, cause the computing device to:
generate camera synchronization information based on a rolling shutter rate of a digital camera, the digital camera comprising a plurality of image sensor elements arranged in a plurality sensor lines, the rolling shutter rate to indicate a pattern of sequentially resetting a one of the plurality of sensor lines, exposing the one of the plurality of sensor lines to light at least twice and reading out light exposure information from the one of the plurality of sensor lines;
generate illumination information based on the rolling shutter rate and the pattern, the illumination information indicating sequential sections of a field of view of the digital camera to be illuminated; and
generate a light beam steering signal based on the illumination information, the light beam steering signal to include an indication to cause a directional light source to emit a light beam and to cause a movement of the light beam in at least one of a horizontal or a vertical direction to illuminate the sequential sections of the field of view of the camera.

16. The at least one non-transitory computer-readable storage medium of claim 15, comprising instructions that, in response to being executed at the computing device, cause the computing device to control the camera to capture image data within the sequentially illuminated sections of the field of view of the camera.

17. The at least one non-transitory computer-readable storage medium of claim 15, the camera synchronization information indicating initiation of an image capture operation.

18. The at least one non-transitory computer-readable storage medium of claim 15, the camera synchronization information indicating the field of view of the camera.

19. The at least one non-transitory computer-readable storage medium of claim 15, comprising instructions that, in response to being executed at the computing device, cause the computing device to generate the camera synchronization information based on receipt of a user input.

20. The at least one non-transitory computer-readable storage medium of claim 15, the light beam steering information indicating a position of the light beam within the field of view of the camera for each of the sequential sections of the field of view of the camera to be illuminated.

* * * * *